No. 777,305. PATENTED DEC. 13, 1904.
T. PRIESTNALL.
DRINKING VESSEL OR THE LIKE.
APPLICATION FILED JUNE 18, 1904.
NO MODEL.

WITNESSES:
D. Webster, Jr.
Wm. Rooney

INVENTOR
Thomas Priestnall
BY
ATTORNEY.

No. 777,305.

Patented December 13, 1904.

UNITED STATES PATENT OFFICE.

THOMAS PRIESTNALL, OF PHILADELPHIA, PENNSYLVANIA.

DRINKING VESSEL OR THE LIKE.

SPECIFICATION forming part of Letters Patent No. 777,305, dated December 13, 1904.

Application filed June 18, 1904. Serial No. 213,120. (No model.)

*To all whom it may concern:*

Be it known that I, THOMAS PRIESTNALL, of the city and county of Philadelphia, State of Pennsylvania, have invented an Improvement in Drinking Vessels or the Like, of which the following is a specification.

It is the object of my invention to provide a tumbler, cup, mug, or other drinking vessel having a transparent bottom with a compartment to contain an object to be displayed for artistic or advertising purposes. By forming the said compartment with a detachable base-cap applied to the bottom of the vessel the pictures or advertisements in the compartment may be changed. In the preferred construction the vessel is provided with a double bottom, forming an intermediate air-space, which may have one or more openings in the sides communicating with the air, thus forming an air-space above the compartment in which the object to be displayed is contained.

Figure 1:
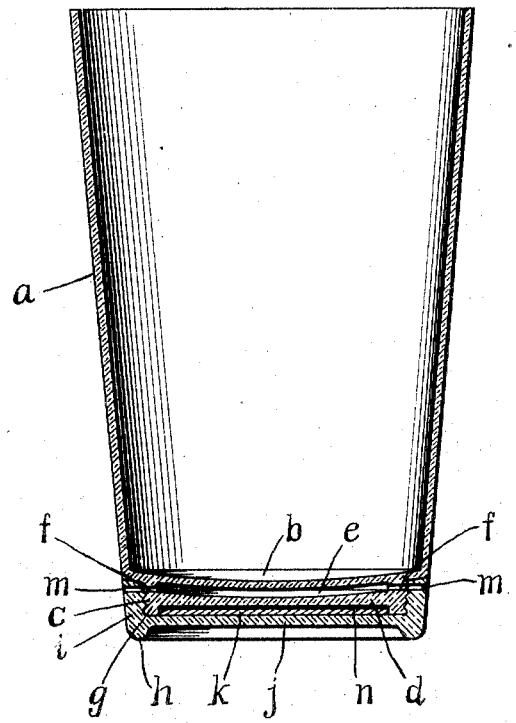
Figure 2:
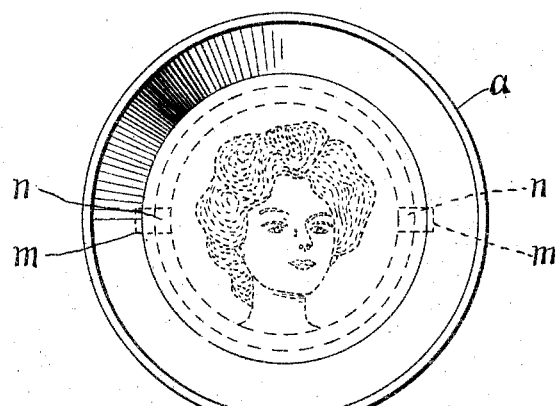

In the drawings, Figure 1 is a vertical section of a tumbler embodying my invention, and Fig. 2 is a plan view of the same.

In the drawings I have shown my invention applied to a glass tumbler; but it may be applied to a variety of other articles, such as cups, mugs, and tankards.

The body $a$ may be of any material, transparent or opaque. The base $b$ is transparent and is preferably formed of slightly-reduced diameter, externally threaded, as at $c$. Below the bottom proper is a second or false bottom $d$ of transparent material, forming with the bottom proper an air-space $e$. In the sides of the threaded base are openings $f$ into the air-space $e$. The lower edge of the base projects slightly below the false bottom $d$, forming an annular rim $g$.

$h$ is the base-cap, having an annular internally-threaded rim $i$, adapted to be screwed upon the threads $c$, and a transparent web $j$. When the base-cap is screwed upon the threaded end $c$, as shown in Fig. 1, this base-web $j$ forms, with the false bottom $d$, a space $n$, adapted to contain an object to be displayed, such as a disk $k$ of paper, glass, or other transparent material having a picture. The side wall of the base-cap is provided with one or more openings $m$, adapted to register with the openings $f$ when the base-cap is screwed on, as shown in Fig. 1, thus permitting the air to circulate through the air-space $e$ above the compartment which contains the object.

The space $e$ between the base of the glass and the false bottom enables less thickness of glass to be interposed above the object without unduly weakening the bottom. This renders the object more visible and less liable to be blurred.

The invention may be used not only for producing an artistic or ornamental effect, but also for advertising purposes and for displaying toasts, epigrams, and extracts for drinking-mugs printed on transparent disks. By detaching the base-cap the displayed object may be removed and changed from time to time.

What I claim as new, and desire to secure by Letters Patent, is as follows:

1. A drinking vessel or the like, having a double bottom formed of transparent material with an intermediate air-space between, and a detachable base-cap having a transparent web forming with the lower portion of the bottom a compartment to contain a replaceable object to be displayed.

2. A drinking vessel or the like, having a double bottom formed of transparent material with an intermediate air-space between and provided with an opening in its side to said air-space and a detachable base-cap having a transparent web forming with the lower portion of the bottom a compartment to contain a replaceable object to be displayed.

3. A drinking vessel or the like, having a double bottom formed of transparent material with an intermediate air-space between and provided with an opening in its side to said air-space and a detachable base-cap having a transparent web forming with the lower portion of the bottom a compartment to contain a replaceable object to be displayed, and having an opening in its side registering with the opening into the air-space when said base-cap is attached.

4. A drinking vessel, consisting of the body portion $a$ having the threaded base $c$ and a double bottom $b$, $d$, of transparent material forming an intermediate air-space $e$, and the threaded detachable base-cap $h$ adapted to be screwed to the base $c$ having a transparent web $j$ forming with the bottom $d$ a compartment $n$.

In testimony of which invention I have hereunto set my hand.

THOMAS PRIESTNALL.

Witnesses:
  JNO. WM. TINSLEY,
  R. M. KELLY.